(12) United States Patent
Reike et al.

(10) Patent No.: US 7,429,142 B2
(45) Date of Patent: Sep. 30, 2008

(54) TRAY PLUG

(75) Inventors: Aaron S. Reike, Cincinnati, OH (US); James E. Johanson, Old Chatham, NY (US); Keith E. Antal, Sr., Valatie, NY (US)

(73) Assignee: Sonoco Development, Inc., Hartsville, SC (US)

( * ) Notice: Subject to any disclaimer, the term of this patent is extended or adjusted under 35 U.S.C. 154(b) by 238 days.

(21) Appl. No.: 11/402,607

(22) Filed: Apr. 12, 2006

(65) Prior Publication Data

US 2007/0243014 A1 Oct. 18, 2007

(51) Int. Cl.
*F16B 9/02* (2006.01)

(52) U.S. Cl. .................. 403/194; 403/176; 403/177; 403/192; 403/199; 403/201; 312/265.2; 312/265.3; 108/147.12; 108/147.15; 108/192

(58) Field of Classification Search .............. 403/171, 403/173, 176, 177, 192, 194, 199, 201; 312/265.1, 312/265.2, 265.3, 265.4; 108/180, 190, 192, 108/147.12, 147.15; 211/182, 186, 188, 211/189, 194

See application file for complete search history.

(56) References Cited

U.S. PATENT DOCUMENTS

| | | | |
|---|---|---|---|
| 1,733,859 A | 10/1929 | Brubaker | |
| 2,886,388 A | 5/1959 | Perlmutter | |
| 2,934,250 A | 4/1960 | Stotz | 229/6 |
| 3,134,566 A | 5/1964 | Beene | |
| 3,480,178 A | 11/1969 | Morgan | 206/506 |
| 3,504,877 A | 4/1970 | Lyon, Sr. | |
| 3,855,944 A | 12/1974 | Skubie et al. | 108/55 |
| 4,236,664 A | 12/1980 | Hartelmuller | 229/49 |
| 4,359,947 A * | 11/1982 | Marschak | 211/186 |
| 4,550,839 A | 11/1985 | Good | 211/189 |
| 4,579,233 A | 4/1986 | Hepp | 211/126 |
| 4,675,937 A * | 6/1987 | Mitomi | 403/194 |
| 4,676,429 A | 6/1987 | Crowe et al. | 229/109 |
| 4,744,612 A | 5/1988 | Winter et al. | |
| 4,745,867 A | 5/1988 | Niemiec | |
| 4,852,501 A * | 8/1989 | Olson et al. | 108/147.13 |
| 4,998,023 A * | 3/1991 | Kitts | 211/188 |
| 5,522,539 A | 6/1996 | Bazany | 229/199 |
| 5,544,806 A | 8/1996 | Anderson et al. | 229/178 |
| 5,906,344 A | 5/1999 | Atkinson et al. | |
| 6,131,805 A | 10/2000 | Gasior | 229/174 |
| 6,205,738 B1 * | 3/2001 | Chen | 312/265.4 |
| 6,227,442 B1 | 5/2001 | Evans, Jr. | 229/122.31 |
| 6,247,414 B1 * | 6/2001 | Sikora et al. | 108/190 |
| 6,381,811 B2 * | 5/2002 | Smith et al. | 24/289 |
| 6,675,970 B1 | 1/2004 | Nemoto | 206/521 |
| 6,820,847 B2 | 11/2004 | Camarota et al. | 248/188 |
| 7,281,648 B2 | 10/2007 | Lowry | 229/199 |
| 2006/0151410 A1 | 7/2006 | Lowry et al. | 211/126.16 |

FOREIGN PATENT DOCUMENTS

| | | | |
|---|---|---|---|
| AU | 514 220 B2 | 1/1981 | |
| FR | 2 275 372 A | 1/1976 | |

* cited by examiner

*Primary Examiner*—Michael P Ferguson
(74) *Attorney, Agent, or Firm*—DLA Piper US LLP (57) ABSTRACT

The invention relates to a tray plug that includes a base portion; a plurality of towers extending upwardly away from the base portion; a secondary base portion contiguous with the underside of the base portion; and a means for securing the plug to a display structure, whereby the tray plug can be quickly secured and subsequently removed from a display such as a point-of-purchase display.

15 Claims, 7 Drawing Sheets

TRAY PLUG

FIELD OF THE INVENTION

The invention relates to tray plugs, more particularly, to removable tray plugs that are utilized in conjunction with point-of-purchase displays.

BACKGROUND

Point-of-purchase displays for the display and sale of goods is well known. These types of displays are often used due to their portability, efficient use of vertical display space, minimal in-store maintenance and strength. Typically, point-of-purchase displays are often constructed of corrugated components that include product display trays vertically oriented over one another as well as posts that support and separate the display trays.

One method of securing display posts to a display tray includes the use of folded corrugated tabs to assist in holding the posts in position. However, these corrugated tabs often fail to hold the posts firmly in position, which results in the posts becoming dislodged and falling over during the building process. Moreover, display posts often shift during transport to a particular location or during normal end-use, thereby weakening the display unit and possibly even leading to its collapse.

Thus, there is a need in the industry for a tray plug that can be easily and quickly engaged and disengaged with a point-of-purchase display tray, while also providing the requisite structural stability to the display structure.

SUMMARY OF THE INVENTION

This invention relates to a tray plug including a base portion; a plurality of towers extending upwardly away from the base portion; a secondary base portion contiguous with the underside of the base portion; and a means for securing the plug to a display structure.

A further aspect of the invention relates to a display structure including at least one display tray having at least one display tray cutout, wherein the tray plug is secured in the display tray cutout.

A further aspect of the invention relates to a method of securing the tray plug in a display tray cutout including inserting the tray plug into the display tray cutout, wherein the first flange is engaged with a bottom surface of the display structure; seating the secondary base portion within the display tray cutout such that movement of the tray plug is minimized and an overhang defined by the size difference between the base and secondary base portions, wherein the overhang is in contact with a top surface of the display structure; and applying pressure to the means for securing wherein the means for securing is a pivoting tab including a substantially L-shaped member having a major portion and minor portion, a downward extending member having a second flange, the downward member extending away from the minor portion, such that the second flange is engaged with the bottom surface of the display structure.

A further aspect of the invention relates to a method for building a point-of-purchase display including inserting at least one tray plug into at least one corresponding display tray cutout, wherein the at least one tray plug is locked into position; and inserting a display post into a tray plug recess defined by the plurality of towers extending upwardly away from the base portion.

BRIEF DESCRIPTION OF THE DRAWINGS

For the purpose of illustrating the invention, there is shown in the drawings a form which is presently preferred; it being understood, that this invention is not limited to the precise arrangements and instrumentalities shown.

DETAILED DESCRIPTION OF THE DRAWINGS

It will be appreciated that the following description is intended to refer to specific embodiments of the invention selected for illustration in the drawings and is not intended to define or limit the invention, other than in the appended claims.

Figure 1:
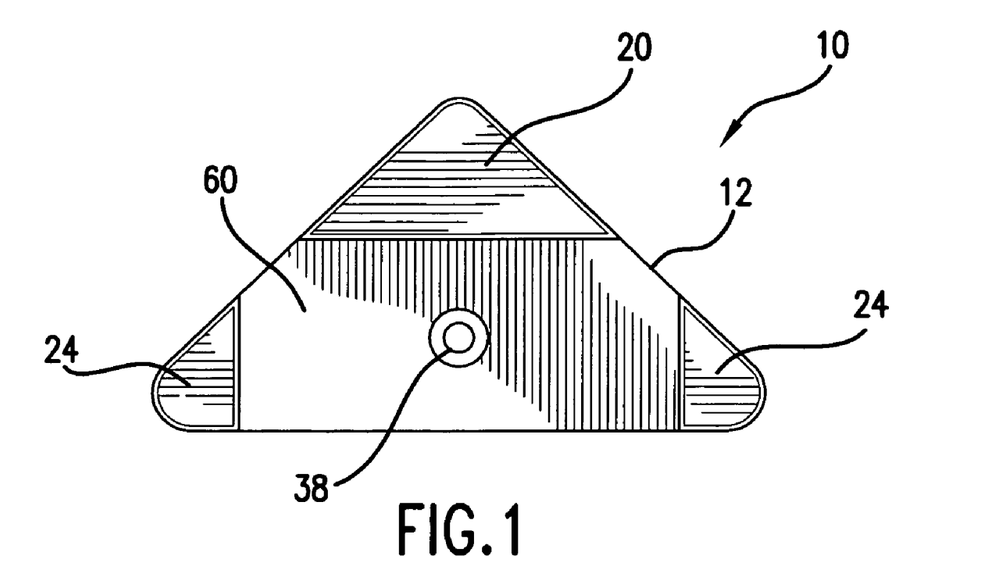
FIG. 1 is a top view of an embodiment of a tray plug according to the present invention.
Figure 2:
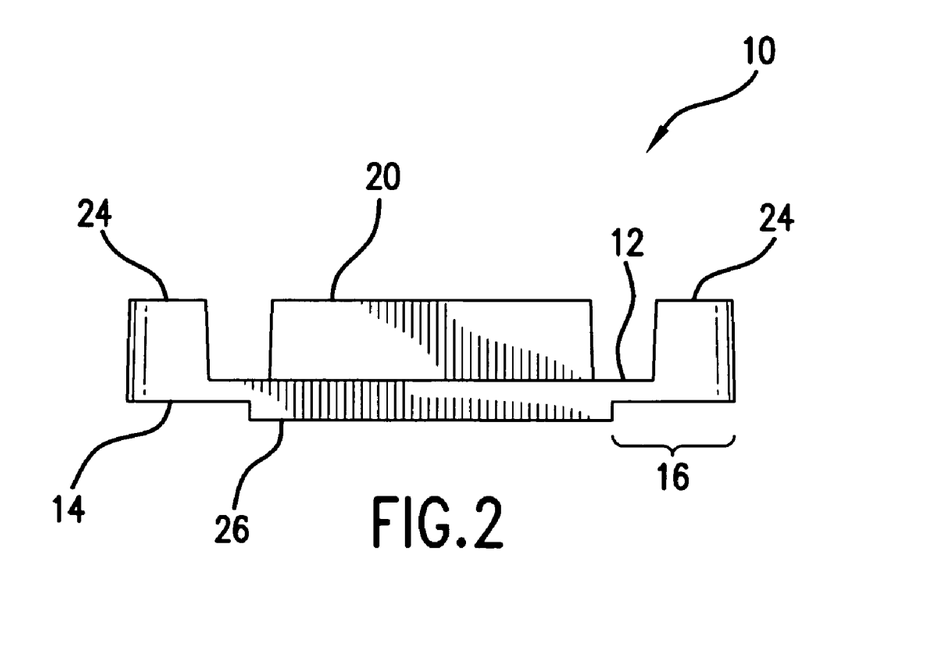
FIG. 2 is a front view of an embodiment of a tray plug according to the present invention.
Figures 3, 4, 5, 6:
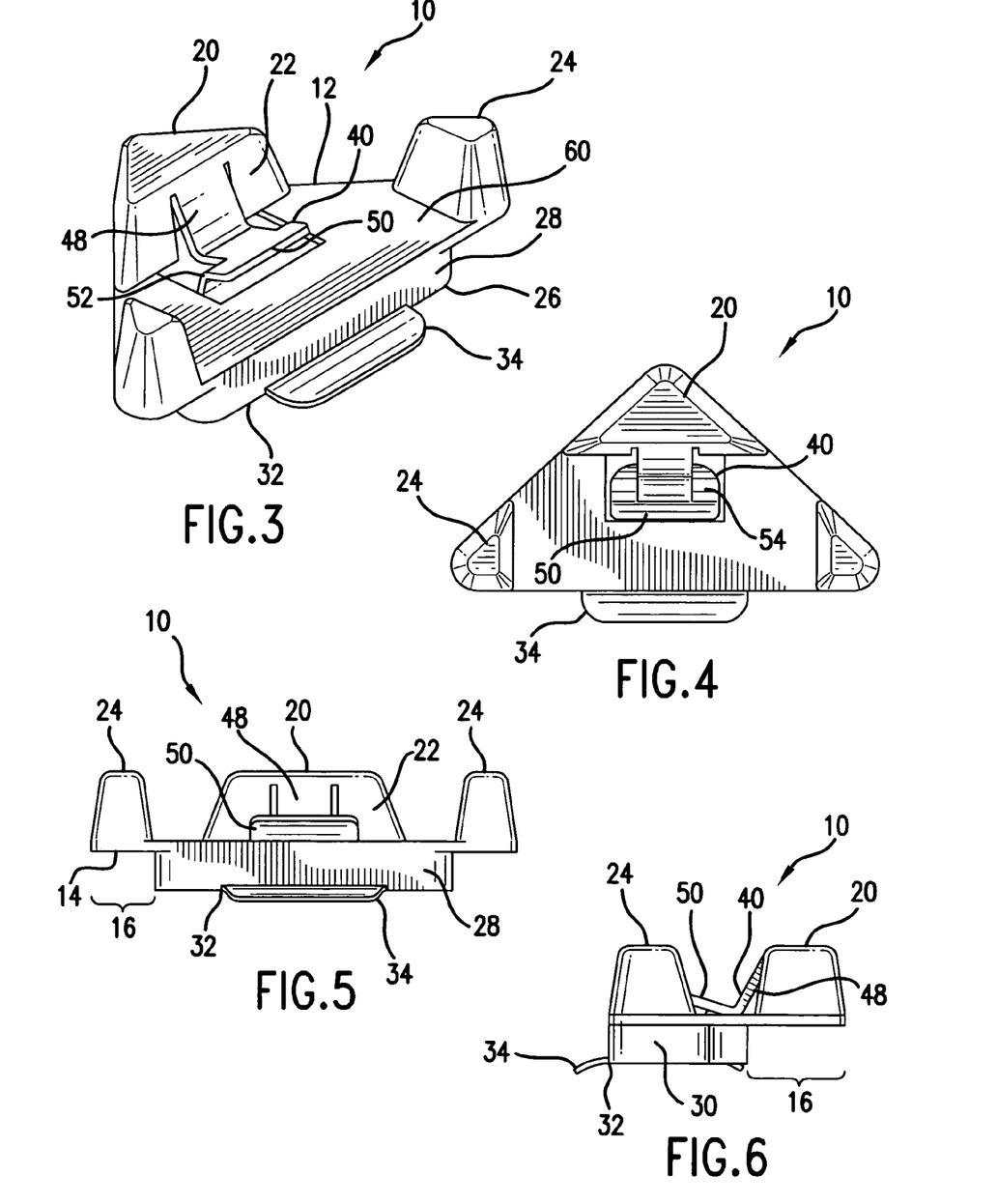
FIG. 3 is a perspective view of an embodiment of a tray plug according to the present invention.
FIG. 4 is a top view of an embodiment of a tray plug according to the present invention.
FIG. 5 is a front view of an embodiment of a tray plug according to the present invention.
FIG. 6 is a side view of an embodiment of a tray plug according to the present invention.

Referring to the drawings, where like reference numerals identify like elements, forms of a tray plug are shown and designated generally by reference numeral 10. With reference to FIGS. 1-3, the tray plug 10 generally includes a base portion 12; a raised structure for supporting a column that in some examples includes one or more of towers extending upwardly away from the base portion 12; a secondary base portion 26 contiguous with the underside 14 of the base portion 12; and a means for securing the tray plug.

The tray plug 10 can be constructed of any number of suitable materials known to one skilled in the art capable of maintaining its structural integrity during normal use conditions. Examples of such suitable materials include, but are not limited to, cardboard, metal, wood and plastic. Some examples of the tray plug 10 are constructed of a thermoplastic material, where the various features (e.g., the secondary base portion, the plurality of towers, etc.) are integrally molded.

The base portion 12 of the tray plug 10 can have a variety of shapes including, but not limited to, circular, square, rectangular or triangular. The illustrated example of the base portion 12 is triangular in shape. The base portion 12 has dimensions that render it larger than the particular display tray cutout 64 (FIG. 7) into which the tray plug 10 is to be inserted, such that an overhang 16 is defined by the size difference between the base portion 12 and secondary base portion 26.

Figure 7:
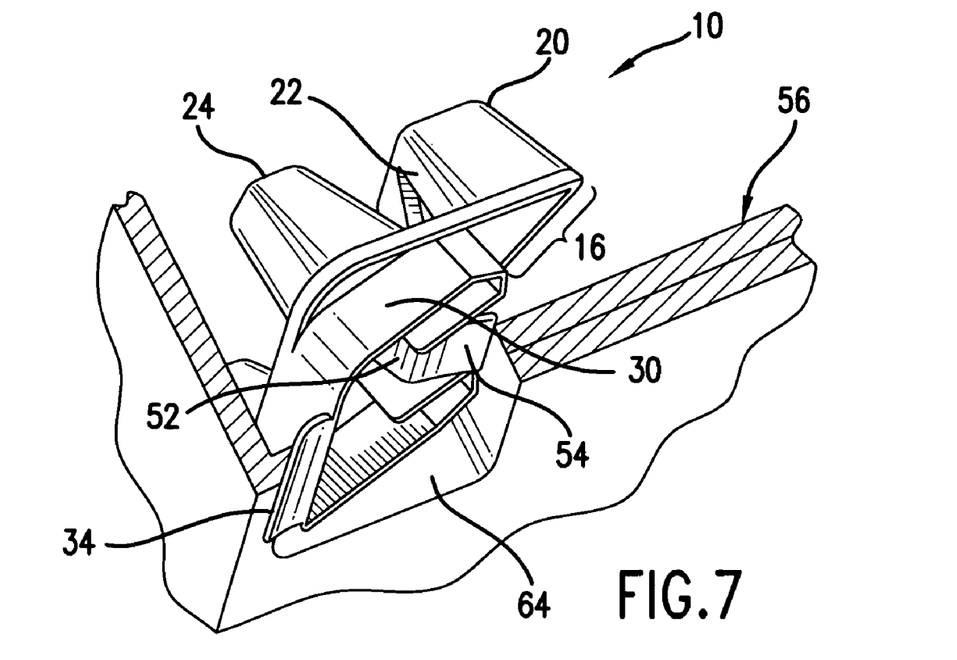
FIG. 7 is a perspective view of an embodiment of a tray plug being inserted into a display tray cutout.

Referring back to FIGS. 1-3, the secondary base portion 26 is contiguous with the underside 14 of the base portion 12, where the secondary base portion 26 includes a front wall 28 having a lower edge 32 as well as at least one sidewall 30 adjacent thereto. The secondary base portion 26 may be integrally formed with the base portion 12, or alternatively, it may be separately formed and secured to the base portion 12 according to those methods known in the art. The secondary base portion 26 can have a first flange 34 extending outwardly from the lower edge 32 of the front wall 28. As shown in FIG. 7, the first flange 34 acts to stabilize the front portion of the tray plug 10 when engaged with the underside 58 of the display structure 56.

Figure 8:
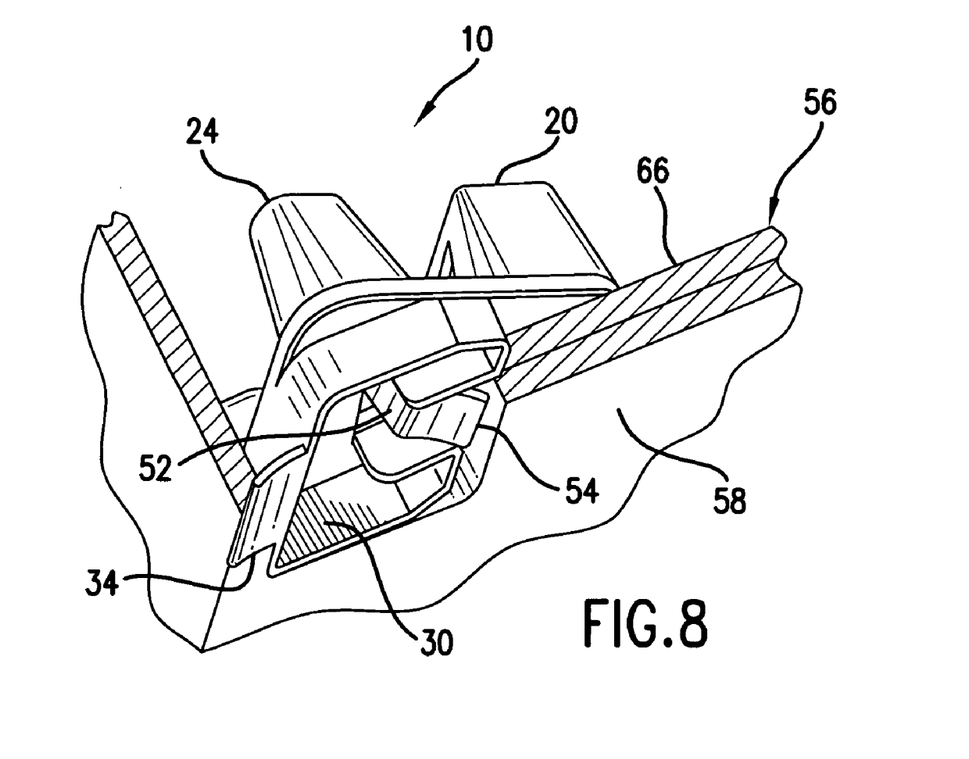
FIG. 8 is a perspective view of an embodiment of a tray plug being inserted into a display tray cutout.
Figure 9:
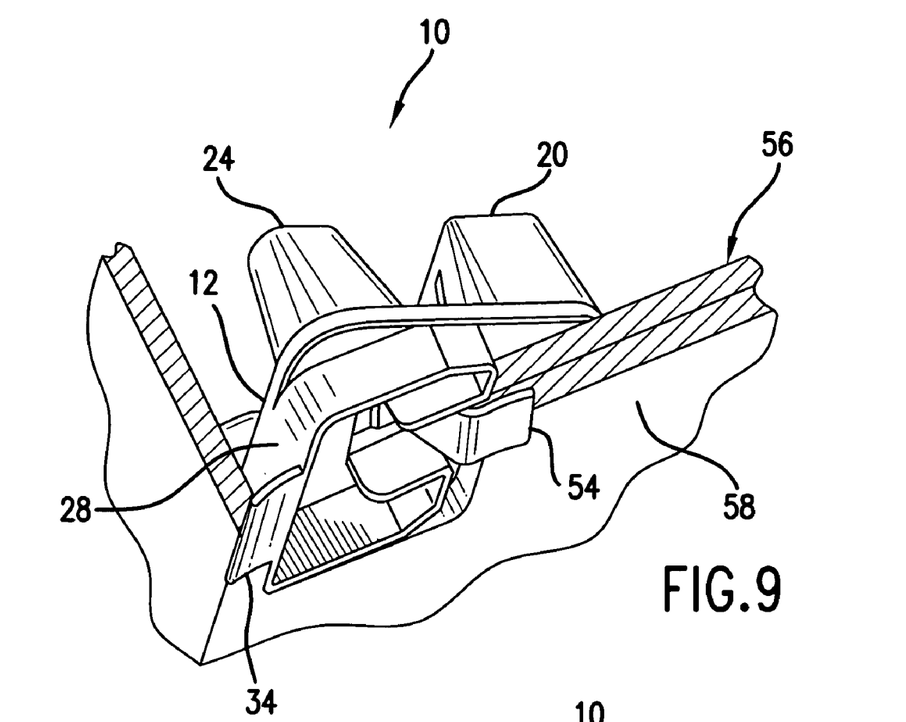
FIG. 9 is a perspective view of an embodiment of a tray plug inserted into a display tray cutout.
Figure 10:
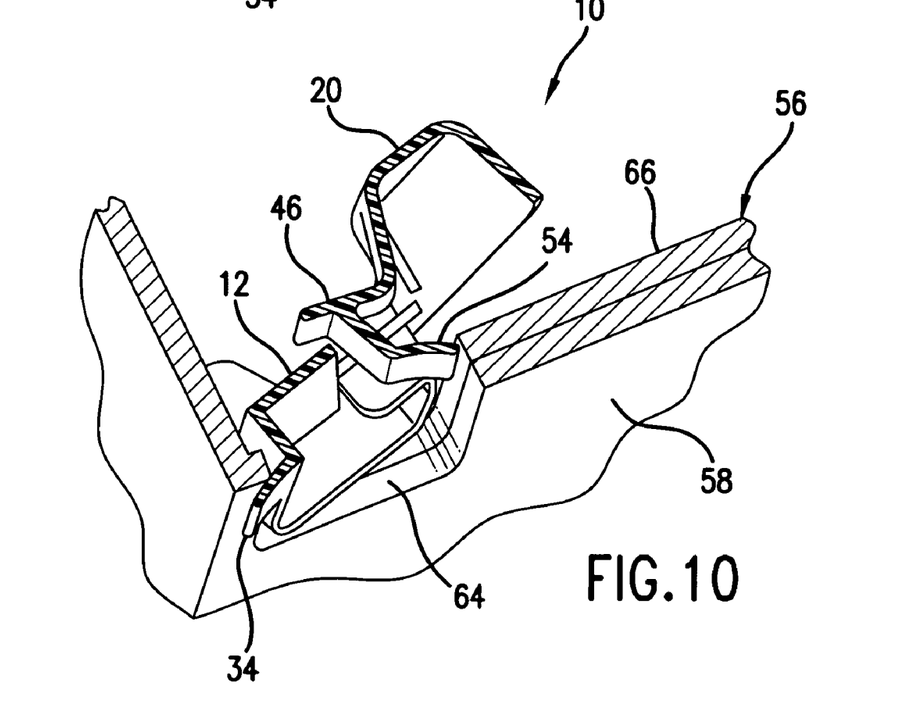
FIG. 10 is a cross-sectional view of an embodiment of a tray plug being inserted into a display tray cutout.
Figure 11:
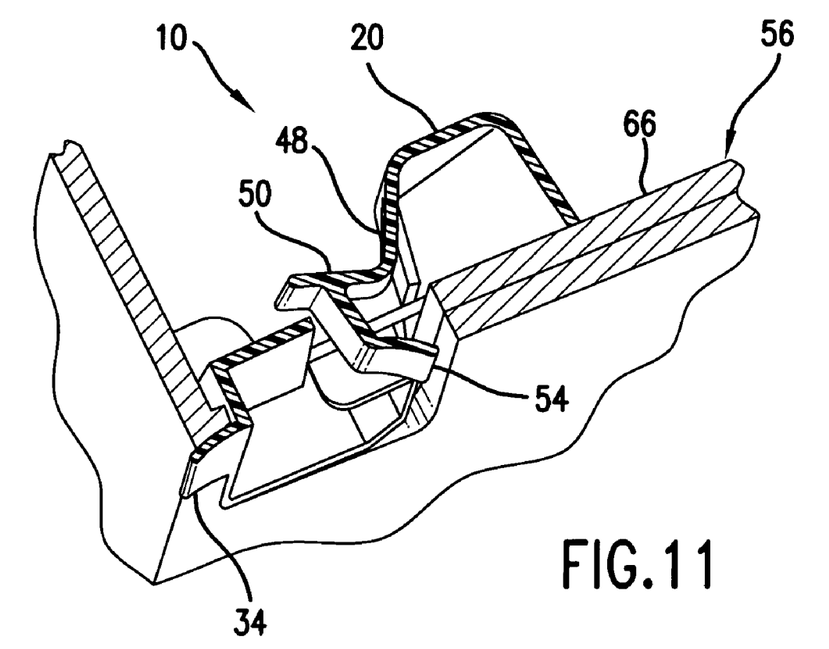
FIG. 11 is a cross-sectional view of an embodiment of a tray plug engaged with a display tray cutout.
Figure 12:
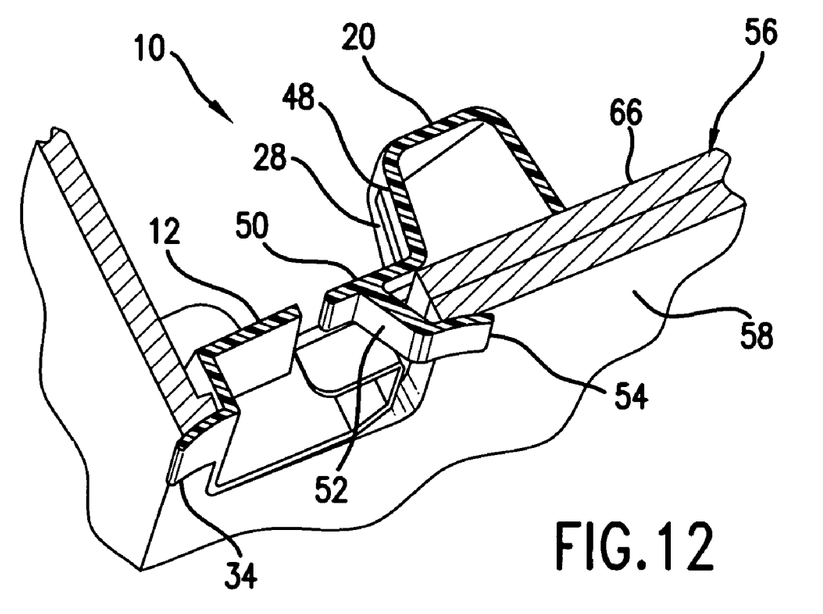
FIG. 12 is a cross-sectional view of an embodiment of a tray plug inserted and engaged with a display tray cutout.

Referring to FIGS. 4 and 7-8, the secondary base portion 26 can have a variety of shapes including, but not limited to, circular, triangular, square, rectangular and U-shaped. The dimensions of the secondary base portion 26 should render it smaller in area than the base portion 12, thereby forming the aforementioned overhang 16. The secondary base portion 26 should also be proportioned so that it fits snugly within the display tray cutout 64. The secondary base portion 26 can be hollow or solid, in total or in part, with the proviso that when it is solid sufficient space is available for a pivoting tab 40, described below.

As shown in the FIGS. 1-3 and 5-6, the illustrated example of the plug 10 includes a major tower 20 and one or more minor towers 24 extending upwardly away from the base portion 12 and arranged such that they define a plug recess 60 formed therebetween. The plug recess 60 is capable of accepting a display post used in conjunction with the display structure 56, where the towers act to stabilize the display post for structural integrity of the display structure 56. The dimensions of the towers can be formed to accommodate display posts of a variety of sizes. Typically, when a triangular base portion 12 is utilized the plurality of towers are positioned at the corners of the base portion 12. Preferably the towers have a height of about ⅝ inches (approximately 1.59 centimeters).

As shown in FIGS. 1 and 2, the means for securing the tray plug 10 to a display structure 56 can include an aperture 38, where a nail or screw can be inserted through the aperture to secure the tray plug to a base pallet. Alternatively, as shown in FIGS. 3-12 the means for securing 36 can include a pivoting tab 40 integral with the interior facing wall 22 of the major tower 20. The pivoting tab 40 can be pressed into position as shown in FIGS. 7-10 where snaps or detents lock the tray plug 10 into position.

The pivoting tab 40 includes a substantially L-shaped member 46 having a major portion 48 and a minor portion 50. The pivoting tab 40 further includes a downward extending member 52 having a second flange 54, which extends away from the underside of the minor portion. The pivoting tab 40 can be integrally formed with interior facing wall 22 of the major tower 20 or can be otherwise attached thereto using known methods. When the pivoting tab 40 is in the locked position, the major portion 48 is substantially planar with the interior facing wall 22 of the major tower 20 and the minor portion 50 is substantially planar with the base portion 12. As shown in Figs., the second flange 54 engages the bottom surface 58 of the display structure 56, thereby securing the tray plug 10 to the display structure 56.

The first 34 and second 54 flanges act to apply a downward force to the tray plug 10 that is resisted by the overhang 16 of the base portion. In addition, the secondary base portion 26 serves to seat the tray plug 10 within the display tray cutout 64 so that any movement of the tray plug 10 is minimized once it is locked into position. As a result, the tray plug 10 is securely held in position such that it provides stability and structural integrity to a display structure 56 upon insertion of the display posts.

The method for securing the tray plug in the display tray cutout 64 includes initially inserting the first flange 34 into the display tray cutout 64 so that it is engaged with the bottom surface 58 of the display structure 56. Subsequently, the secondary base portion 26 is seated in the display tray cutout 64 so that the overhang 16 of the base portion 12 is in contact with the top surface 66 of the display structure 56. Pressure is then applied to the minor portion 50 of the pivoting tab's L-shaped member 46, where the downward extending member 52 and second flange 54 are directed into the display tray cutout 64. Thus, the second flange 54 is engaged with the bottom surface 58 of the display structure 56, thereby securing the tray plug 10 in the display tray cutout 64.

Once the tray plug 10 is inserted into the display tray cutout 64 and locked, a display post is positioned in the plug recess 60 defined by the plurality of towers. The display post can be of any general shape capable of being properly retained by the tray plug 10 and corresponds to the design of the tray plug 10. Preferably, the display post is rectangular in structure. Upon insertion, the display post rests on the base portion 12 of the tray plug, including the pivoting tab 40. As a result, the display post serves to maintain the pivoting tab 40 of the tray plug in the locked position.

Figure 13:
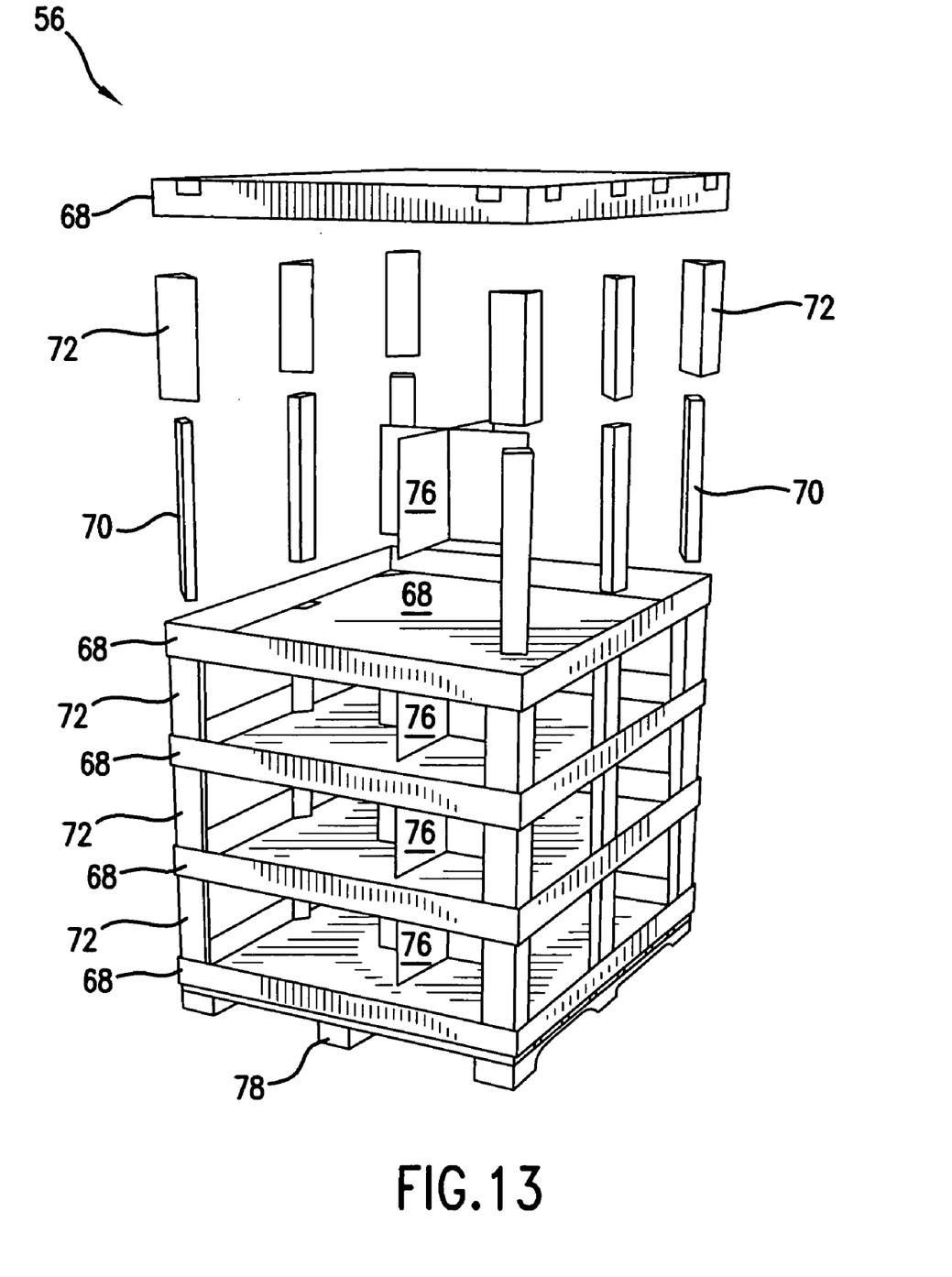
FIG. 13 is a perspective view of a multi-tray display incorporating a present invention.
Figure 14:
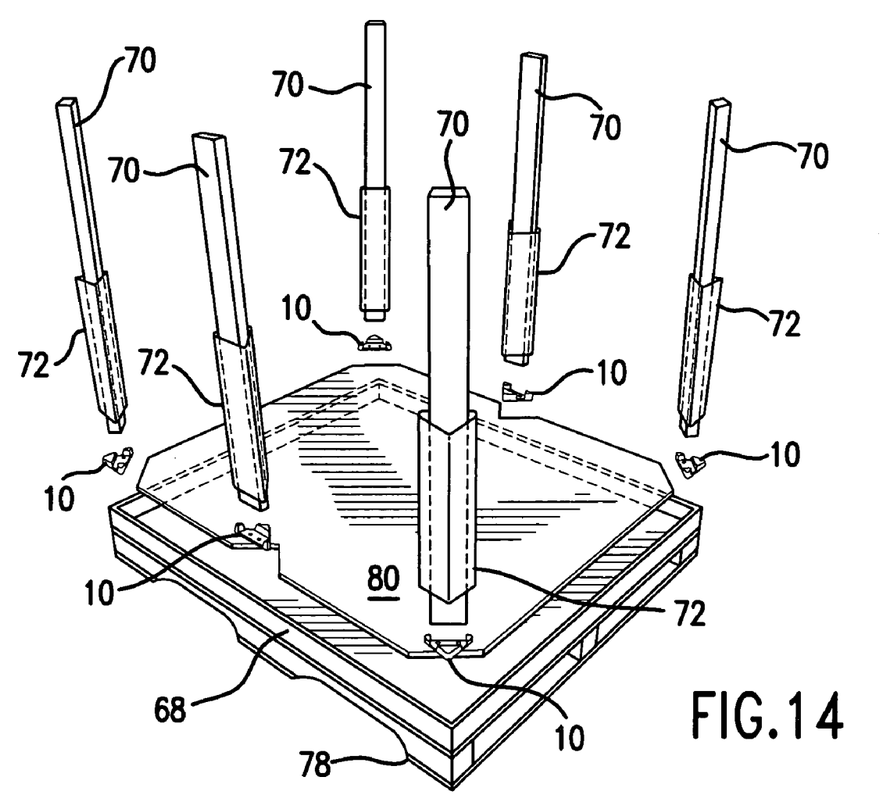
FIG. 14 is a perspective, partially exploded view of a base, support posts, and tray plugs according to the present invention.
Figure 15:
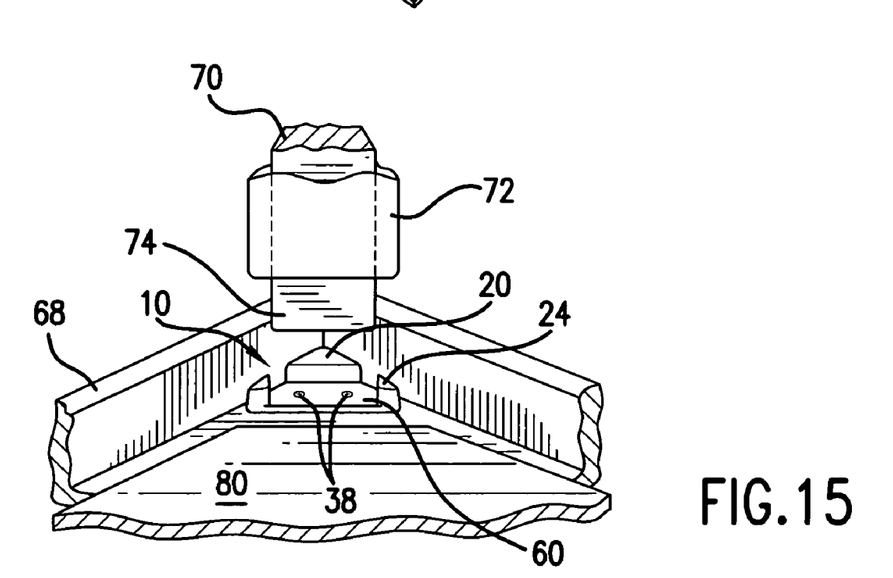
FIG. 15 is a perspective, partially exploded view of a base, tray plug, and support post of the present invention.

Referring to FIGS. 13-15, the assembly of a display 56 is illustrated. As shown in FIG. 13, the display 56 includes a plurality of trays 68 having a plurality of connector posts 70 extending therethrough. Tubular exterior posts 72, which may have a cross-sectional shape matching that of the plugs, and which in the illustrated example are triangular, are placed around the connection posts 70 between adjacent trays 68. Central supports 76 may also be placed between adjacent trays 68. Some examples of a tray 68 may include a layer pad 80 on their bottom surface. The illustrated example of the display 56 is supported on a pallet 78.

As best illustrated in FIGS. 14 and 15, the lower end 74 of each connection post 70 is inserted into the recess 60 of a tray plug 10. Each of the lowermost tubular extension posts 72, which are disposed between the lowermost tray 68 and the tray 68 above the lowermost tray, are installed around both the connection posts 70 and plug 10. Once each of the connection posts 70 is put in place, and each of the lower most tubular extension posts 72 is put in place, another tray 68 may be placed on top of the tubular exterior posts 72. An alternating sequence of trays 68 and tubular exterior posts 72 may be installed on the connector posts 70 up to the maximum height of the connector posts 70.

A variety of modifications to the embodiments described will be apparent to those skilled in the art from the disclosure provided herein. Thus, the invention may be embodied in other specific forms without departing from the spirit or essential attributes thereof and, accordingly, reference should be made to the appended claims, rather than to the foregoing specification, as indicating the scope of the invention.

The invention claimed is:

1. A plug for removably securing a vertical column to a tray, the plug comprising:

a primary base portion engaging an upperside of a tray;

a column securing structure extending upward from the primary base portion, the securing structure receiving a vertical column when the plug is secured within an opening in the tray;

a secondary base portion depending downward from the primary base portion; and means for securing the plug to the tray having:
- a fixed flange extending outward from a wall of the secondary base portion, and
- a pivoting tab projecting outward from a lower portion of the secondary base portion in a direction opposing the fixed flange, the pivoting tab having:
  - a tray engaging portion structured to engage an underside of the tray to secure the plug within an opening defined within the tray, and
  - a finger engaging portion structured to permit a user to push from the upperside of the tray the pivoting tab out of engagement with the underside of the tray, the finger engaging portion being L-shaped when viewed from a side and having:
    - a downward extending portion secured to the primary base portion, and
    - a substantially horizontal portion extending outward from a bottom of the downward extending portion, the horizontal portion being pushed from the upperside of the tray with the tray engaging portion extending outward from the substantially horizontally extending portion through the opening in the tray.

2. The plug according to claim 1, wherein the column securing structure defines a recess structured to receive a central column.

3. The plug according to claim 2, wherein the column securing structure further defines a periphery structured to mate with an outer tubular column.

4. The plug according to claim 2, wherein the column securing structure includes a plurality of towers defining the recess therebetween.

5. The plug according to claim 4, wherein the plurality of towers includes a major tower and at least one minor tower.

6. The plug according to claim 5, wherein:
the plug has a generally triangular configuration when viewed from the top; and
the major tower and a pair of minor towers are arranged around a periphery of the plug so that one of the towers is disposed in each corner of the plug.

7. The plug according to claim 1, wherein the secondary base portion has a smaller cross sectional area than the primary base portion, so that the primary base portion overhangs the secondary base portion.

8. The plug according to claim 1, wherein the secondary base portion is structured to fit within the opening defined within the tray.

9. The plug according to claim 1, wherein the tray engaging portion is L-shaped when viewed from a side, the tray engaging portion having a downward extending portion extending from the substantially horizontal portion of the finger engaging portion, and an end portion extending substantially horizontally from a lower end of the downwardly extending portion of the tray engaging portion.

10. A convertible display comprising:
a plurality of trays arranged such that one tray is disposed vertically above another;

at least one tray plug having a primary base portion engaging an upperside of a tray and a secondary base portion, a column securing structure extending from the primary base portion, the secondary base portion extending from a surface of the primary base portion opposite the surface from which the column securing structure extends;

at least one column secured within the column securing structure and extending between adjacent, vertically positioned trays, wherein the secondary base portion is secured within an opening in the trays; and means for securing the plus to a tray having
- a fixed flange extending outward from a wall of the secondary base portion,
- a pivoting tab projecting outward from a lower portion of the secondary base portion, in a direction opposing the fixed flange, the pivoting tab having:
  - a tray engaging portion structured to engage an underside of the trays to secure the plug within an opening defined within the trays, and
  - a finger engaging portion structured to permit a user to push from the upperside of the tray the pivoting tab out of engagement with the underside of the trays, the finger engaging portion being L-shaped when viewed from a side, the finger engaging portion having:
    - a downward extending portion secured to the primary base portion, and
    - a substantially horizontal portion extending outward from a bottom of the downward extending portion, with the tray engaging portion, the horizontal portion being pushed from the upperside of the tray extending outward from the substantially horizontally extending portionthrough the opening in the tray.

11. The display according to claim 10, wherein the secondary base portion has a first flange and a second flange, wherein the first flange and the second flange engage an underside of the tray, wherein the second flange is formed on a lower portion of a pivoting tab that is structured to cause the second flange to engage the underside of the tray and release from the underside of the tray.

12. The display according to claim 10, wherein the column securing structure includes a plurality of towers that define a recess and wherein the columns are secured within the recess.

13. The display according to claim 12, wherein the columns comprise a central column secured within the recess and an outer column that mates with a periphery of the towers and substantially surrounds the central column.

14. The display according to claim 12, wherein the plurality of towers comprises a major tower and a plurality of minor towers.

15. The display according to claim 12, wherein the plurality of towers are dimensioned to include a variety of sizes.

* * * * *

UNITED STATES PATENT AND TRADEMARK OFFICE
CERTIFICATE OF CORRECTION

PATENT NO.        : 7,429,142 B2
APPLICATION NO. : 11/402607
DATED             : September 30, 2008
INVENTOR(S)       : Rieke et al.

It is certified that error appears in the above-identified patent and that said Letters Patent is hereby corrected as shown below:

On the Title Page:

At (12) and (75); change "Reike" to --Rieke--.

In Column 6:

At line 16 change "having" to --having:--; delete lines 35 through 39 and insert --portion, the horizontal portion being pushed from the upper side of the tray, with the tray engaging portion extending outward from the substantially horizontally extending portion through the opening in the tray.--

Signed and Sealed this

Third Day of March, 2009

JOHN DOLL
*Acting Director of the United States Patent and Trademark Office*